United States Patent
Baalu et al.

(10) Patent No.: US 9,417,838 B2
(45) Date of Patent: Aug. 16, 2016

(54) VEHICLE SAFETY SYSTEM USING AUDIO/VISUAL CUES

(75) Inventors: Arvin Baalu, Bangalore (IN); Manu Malhotra, Bangalore (IN); Ravi Lakkundi, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 349 days.

(21) Appl. No.: 13/608,722

(22) Filed: Sep. 10, 2012

(65) Prior Publication Data
US 2014/0071280 A1 Mar. 13, 2014

(51) Int. Cl.
*B60R 1/00* (2006.01)
*G06F 3/16* (2006.01)
*G08G 1/16* (2006.01)

(52) U.S. Cl.
CPC ............... *G06F 3/167* (2013.01); *G08G 1/165* (2013.01); *G08G 1/166* (2013.01); *G08G 1/167* (2013.01)

(58) Field of Classification Search
CPC ................................ B60R 1/00; H04N 7/181
See application file for complete search history.

(56) References Cited

U.S. PATENT DOCUMENTS

| | | | |
|---|---|---|---|
| 2004/0226079 A1* | 11/2004 | Rainey | 2/422 |
| 2006/0277666 A1* | 12/2006 | Gertsch et al. | 2/424 |
| 2007/0033029 A1* | 2/2007 | Sakawaki | G10K 11/178 704/233 |
| 2008/0085679 A1* | 4/2008 | Fettig et al. | 455/41.2 |
| 2009/0109292 A1* | 4/2009 | Ennis | 348/158 |
| 2012/0076317 A1* | 3/2012 | Fratti et al. | 381/74 |
| 2012/0275610 A1* | 11/2012 | Lambert et al. | 381/56 |
| 2013/0142393 A1* | 6/2013 | Lord et al. | 382/105 |

FOREIGN PATENT DOCUMENTS

| EP | 1251032 A2 | 10/2002 |
|---|---|---|
| GB | 2446724 A | 8/2008 |

OTHER PUBLICATIONS

European Patent Office, International Search Report of PCT/US2013/058486, WIPO, Nov. 18, 2013, 3 pages.

* cited by examiner

*Primary Examiner* — Dave Czekaj
*Assistant Examiner* — Nam Pham
(74) *Attorney, Agent, or Firm* — Alleman Hall McCoy Russell & Tuttle LLP

(57) ABSTRACT

A system may include one or more data modules operable to receive, process, and transmit data associated with one or more audio and/or visual cues from surroundings of a user. The system may also include one or more cameras and one or more microphones communicatively coupled to the one or more data modules, where the one or more cameras and the one or more microphones are operable to: record, respectively, the one or more audio and/or visual cues; and transmit, respectively, the data associated with the one or more audio and/or visual cues to the one or more data modules. Also, the system may include one or more speakers driven by audio signals received from the one or more data modules.

20 Claims, 4 Drawing Sheets

VEHICLE SAFETY SYSTEM USING AUDIO/VISUAL CUES

BACKGROUND OF THE INVENTION

1. Technical Field

The invention relates to vehicle safety systems, including motorcycle safety systems using audio/visual cues.

2. Related Art

In the United State, per year, there can be millions of vehicle accidents. Tens of thousands of these accidents can be fatal. A great number of these fatal accidents are motorcycle accidents, which have a greater fatality rate than accidents not involving motorcycles.

SUMMARY

A system may include one or more data modules operable to receive, process, and transmit data associated with one or more audio and/or visual cues from surroundings of a user. The system may also include one or more cameras and one or more microphones communicatively coupled to the one or more data modules. The one or more cameras and the one or more microphones are operable to: record, respectively, the one or more audio and/or visual cues; and transmit, respectively, the data associated with the one or more audio and/or visual cues to the one or more data modules. Also, the system may include one or more speakers operable to receive, from the one or more data modules, processed data associated with the one or more audio and/or visual cues. Further, the system may include attachment parts operable to attach aspects of the system to a vehicle or gear of the user, such as a helmet, to alert the user to the recorded audio and/or visual cues.

Other systems, apparatuses, features and advantages may be, or may become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The vehicle safety system (also referred as the VSS) may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
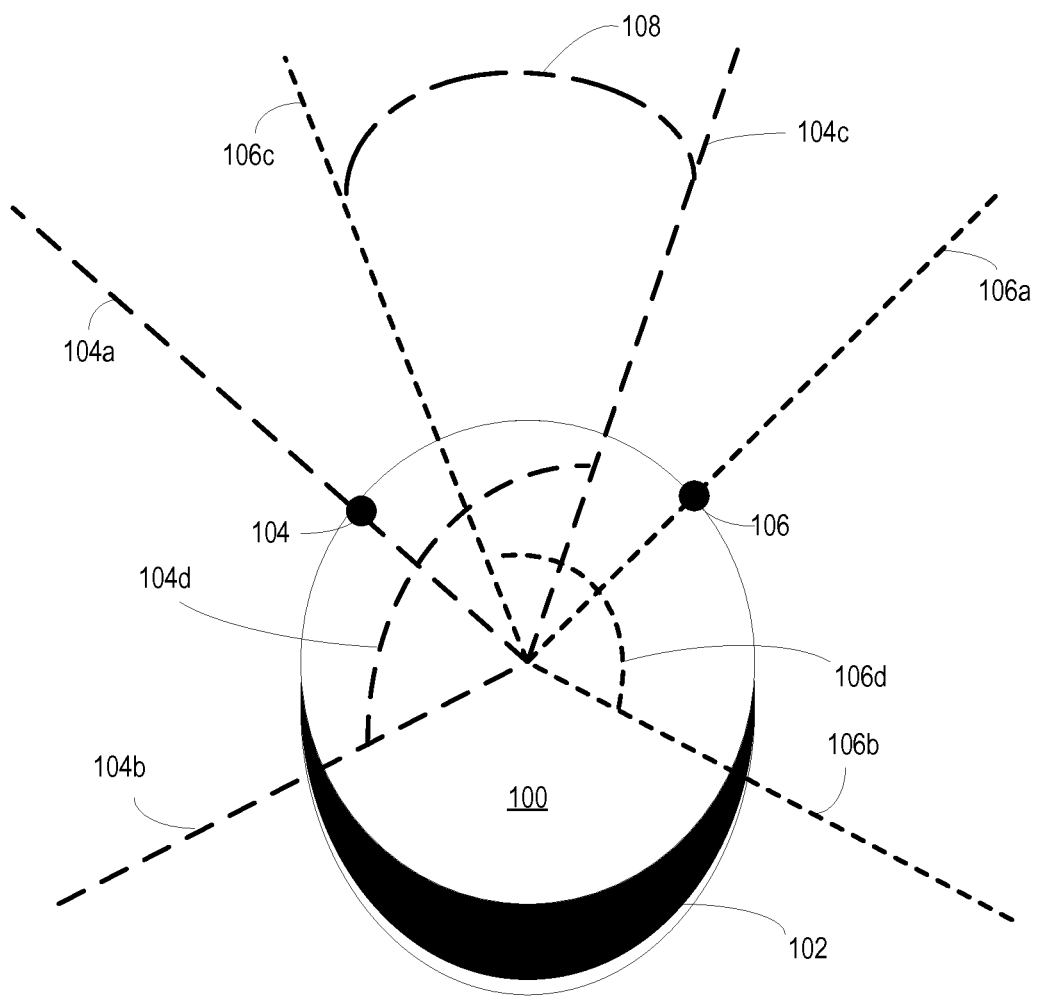
FIG. 1 shows example aspects of an example VSS, including a top perspective view of an example motorcycle helmet that includes cameras for recording rear and side views.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

Described herein is a vehicle safety system (also referred as the VSS) that provides sensory information to a user (such as a user of a vehicle), regarding surroundings of the user and/or the vehicle (such as driving or riding conditions to the side or behind a vehicle). For example, via audio and/or visual sensors (such as microphones, and/or cameras) the VSS may alert a user of approaching vehicles or other objects (such as objects that may be hazardous to the vehicle and/or user). In one aspect, a user may receive audio entertainment via speakers of the VSS, until the VSS detects and alerts a user of an approaching hazardous or emergency driving condition, such as an approaching speeding car or an approaching emergency vehicle, respectively. Further, alerts may serve other purposes besides enhancing safety, such as providing notification of a certain location or type of location, an appointment, time or date, weather condition, and/or the like. The user may interact with the VSS through a tactile or voice input to select, manage, or control the sensory information. As used herein, the terms "sensory information" includes audio, video, alerts, and the like.

The VSS may include an information system, such as one used in conjunction with a vehicle or in conjunction with apparel and/or gear of a user of the vehicle. For example, the VSS may be attached to or integrated with the vehicle or a vehicle information system associated with the vehicle. Also, the VSS may be embedded or secured to apparel and/or gear of the user. For example, the VSS may be combined with a helmet, such a bicycle helmet, a motorcycle helmet (such as motorcycle helmet 100 of FIG. 1), or any other type of vehicle helmet. The VSS may also be combined with other types of headwear, such as hats, bands, or helmets for sports or construction, which will be referred to generally herein as a "helmet."

The VSS may include one or more cameras (such as cameras 104 and 106 of FIG. 1), one or more microphones (such as microphones 302 of FIG. 3); one or more speakers; and one or more control and data modules for receiving, processing, and sending, to a user of the VSS, data associated with audio and/or visual cues from the user's and/or vehicle's surroundings. The VSS may be included as a part of an audio/visual output system, may be a standalone system, or may communicate with the audio/visual output system.

The one or more cameras may be any type of image sensor, such as a low resolution video camera. For example, the resolution of the image sensor may be common intermediate format (CIF) 352×288 to double CIF (DCIF) 528×384. The one or more cameras may be arranged in any manner to record side and rear views of a vehicle or a user of a vehicle. For example, the one or more cameras may be arranged on one or more side or back areas of a vehicle, helmet, and/or any other type of user apparel and/or gear, facing outwards from the vehicle, the helmet, and/or the other type of user apparel and/or gear, respectively. Also, the one or more cameras may be arranged so that their views overlap. In such a case, the one or more cameras may be operable to record substantially complete rear and side views.

The one or more microphones may be arranged in any manner to optimally receive sound surrounding the VSS. For example, the microphones may be arranged on one or more side or back areas of a vehicle, helmet, and/or any other type of user apparel and/or gear, facing outwards from the vehicle, the helmet, and/or the other type of user apparel and/or gear, respectively. Also, the one or more microphones may be arranged so that their fields of sound reception or directional patterns overlap. The microphones may be omnidirectional or unidirectional, and may be arranged to provide noise cancellation, beam formation, and/or any other functionality to enhance detection of audible sounds. Such example arrangements may enhance the one or more microphones' reception of one or more sound signals from the surrounding environment.

The audio/visual output system may include a head unit, amplifier, display device, user interface and any other components that provide audio or visual output to a user. Functionality of the audio/visual output device may include user interface control of the system, navigation, audio equalization, wireless communication, vehicle status and diagnostics, and any other operational functionality related to the vehicle. The audio/visual output system may also include the capability to drive one or more loudspeakers with audio signals to output audible sound.

The one or more speakers driven by the VSS may or may not be included as part of the audio/visual system included on the vehicle. Thus, the VSS may drive the one or more speakers directly or indirectly, or may provide signals to the audio/visual system to drive the one or more speakers. The speakers may be arranged in any manner to provide audible audio signals to a user of a vehicle using the VSS. For example, the one or more speakers may be arranged on one or more front, side, or back areas of a vehicle and/or helmet, and may be facing towards the user. The one or more speakers may be attached to, secured to (such as secured in a pocket), or embedded in the aforementioned areas of a vehicle and/or helmet.

Figure 2:
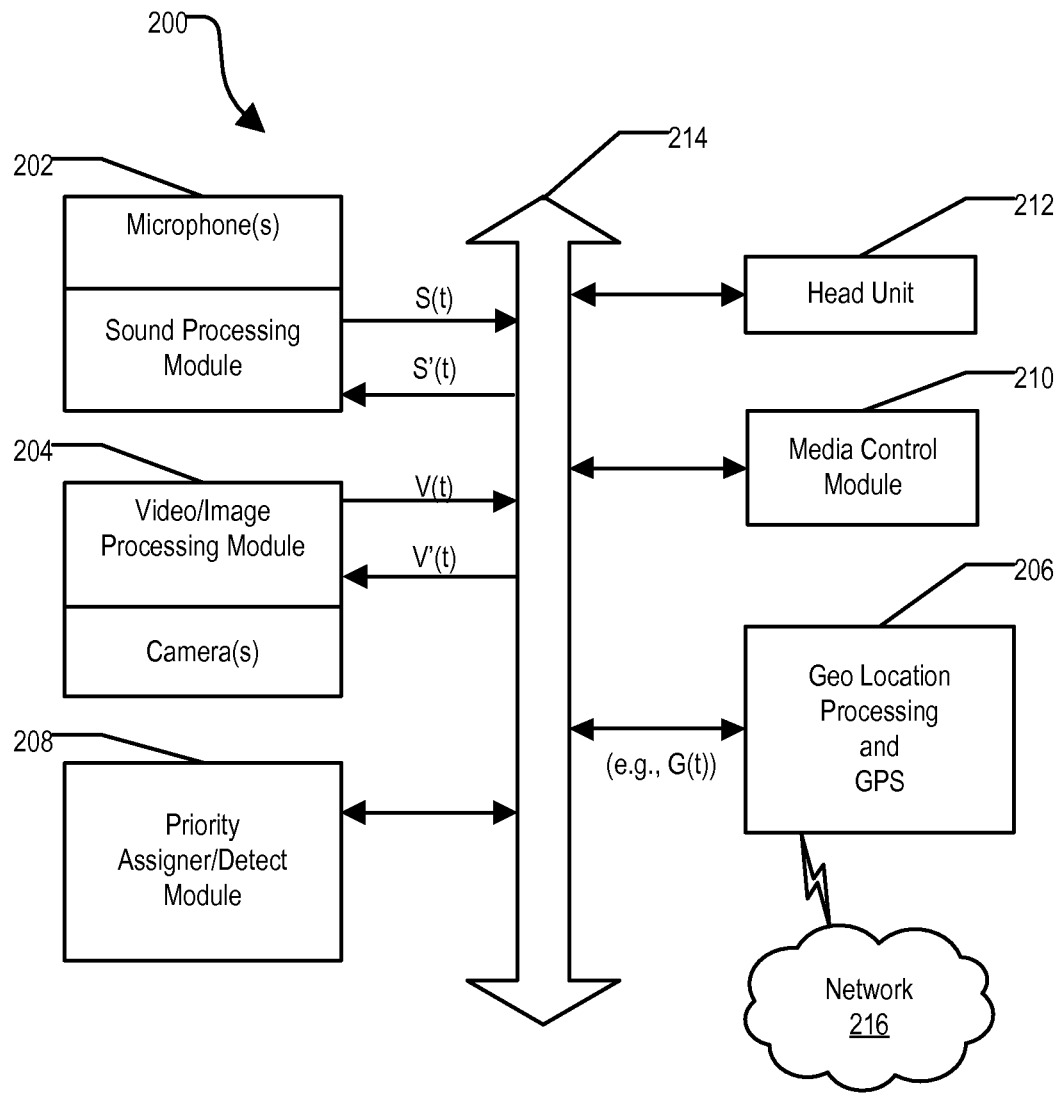
FIG. 2 illustrates a block diagram of example aspects of an example VSS.

The one or more control and data modules may include a sound processing module (such as a sound processing module 202 of FIG. 2), a video/image processing module (such as a video/image processing module 204 of FIG. 2), a geographic location processing module (such as a geographic location processing module 206 of FIG. 2), and one or more control modules (such as a priority assigner/detect module 208 and a media control module 210 of FIG. 2).

The sound processing module may include a sub-module that may generate information related to safety, including a safety score or rating. The sound processing module may also include a sub-module, such as at least one filter (for example, a filter 304 of FIG. 3), that may selectively filter out noise, such as background or environment noise, from one or more sound signals. The sound processing module may also include one or more sub-modules, such as one or more filters (for example, filters 306 and 308 of FIG. 3), that may selectively filter audible sound for detection of warning sounds in the one or more sound signals, such as vehicle sirens or horns. Also, the sound processing module may include a sub-module that can determine the direction or location from which the one or more sound signals are originating (such as a direction processing module 310 of FIG. 3). In one example, where there is more than one microphone in the VSS, directional audio cues are available.

The sub-module of the sound processing module that can generate information related to safety, can generate a safety score or rating based at least partially on one or more filtered sound signals. In one example, the one or more filtered sound signals may have been filtered for warning sounds and/or have noise filtered out by one or more of the respective aforementioned filters and/or sub-modules.

The sound processing module may also include a pattern and/or sound classifier (such as a pattern and/or sound classifier 312 of FIG. 3) that may determine and/or classify a sound, respectively. The pattern and/or sound classifier may determine and/or classify the one or more filtered or non-filtered sound signals as a predetermined sound stored in a database (such as a sound vector database management system (DBMS) 314 of FIG. 3). Identification of sounds may be based on identifying similar characteristics in the detected sound waves and the sound vectors in the sound vector database, such as matching frequency characteristics, impulse response characteristics, or any other sound related parameters. Example classifications may include sound of a vehicle engine, a horn, and/or a siren.

Analogous to the sound processing module, the video/image processing module may include a sub-module that may generate information related to safety, including a safety score or rating. Also, the video/image processing module may also include analogous sub-modules for filtering one or more video/image signals.

Also, the video/image processing module may include a sub-module that includes image recognition capabilities that can determine an object recorded in a video recording. For example, artificial intelligence, image mapping techniques, or some other form of image recognition may identify a vehicle and/or vehicle type (such as a bicycle, motorcycle, car, and truck). In one example, these determinations may also be made by or in conjunction with the sound processing module. For example, a vehicle classifier module 316 of FIG. 3, may determine a vehicle type from a received sound signal, a received image, or a combination of the received sound signal and image signal.

Figure 4:
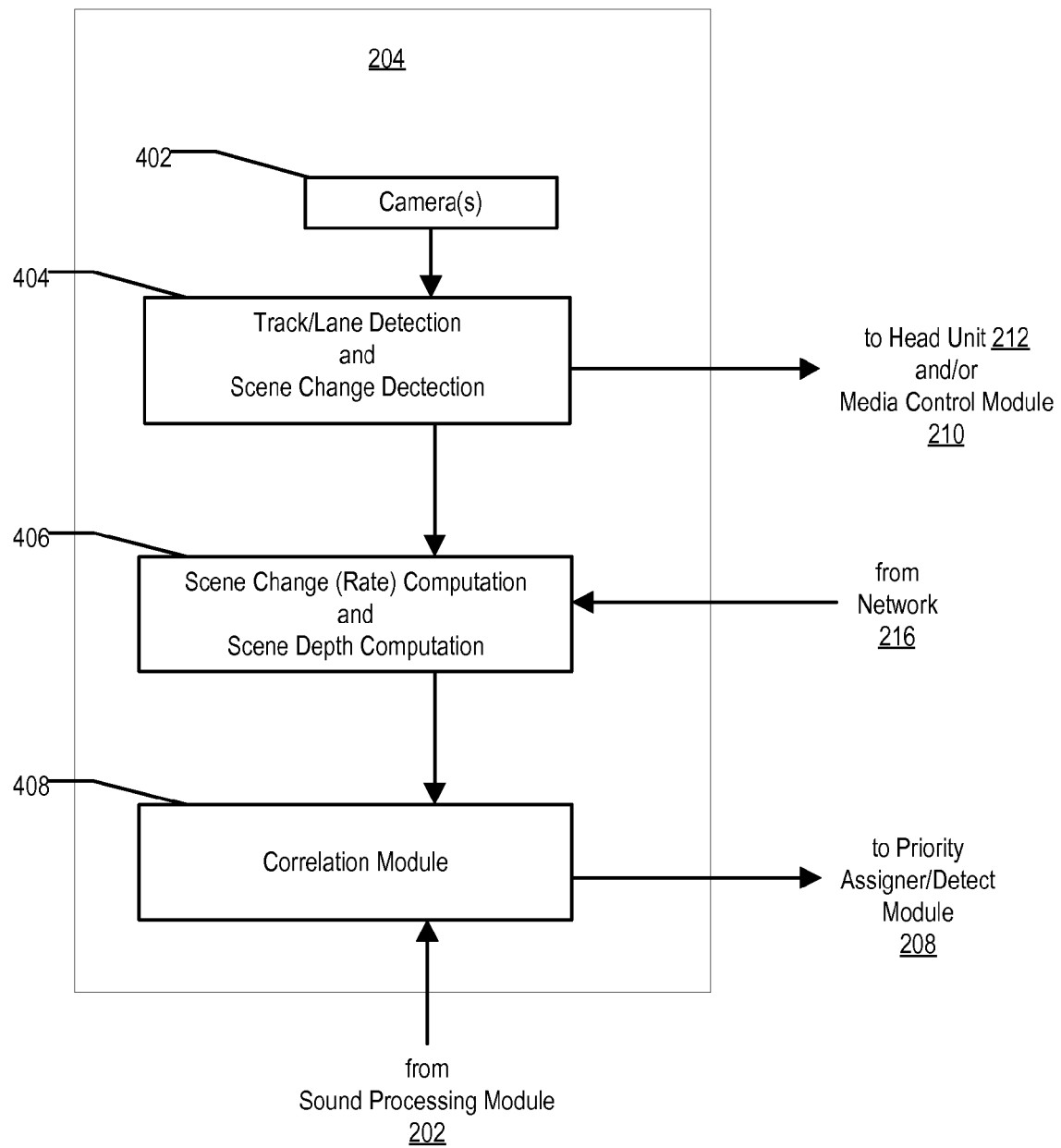
FIG. 4 illustrates a block diagram of an example video/image processing module and example camera(s) of the VSS such as the VSS of FIG. 2.

The image recognition may also determine attributes of the object, such as whether the object is moving or inanimate, the size of the object, its location relative to a user of the VSS, and its behavior (for example, see modules 404-408 of FIG. 4). For example, the image recognition may be able to determine speeding vehicles approaching the user (such as speeding vehicles from behind a user), and recklessly driven vehicles such as vehicles swerving and/or weaving in traffic. In one example, speed and horizontal movement of an approaching object, such as speed and swerving and/or weaving of an approaching vehicle, may be determined by comparing the approaching object to an inanimate object on the road, such as a road barrier and/or a lane marking. Also, a virtual or projected object, such as a projected line may assist such determinations.

Further, the video/image processing module may act as a false alarm detector for the sound processing module, and vice versa. For example, the sound processing module may identify an approaching emergency vehicle (for example, by detecting a siren that becomes gradually louder). However, in some scenarios, what may seem to be an approaching emergency vehicle may be an engine or muffler sound of an approaching vehicle, or audible sound reflected/projected by a flat surface such as a building or tunnel. The video/image process module may detect this miscalculation. For example, the video/image processing module may be able to distinguish emergency vehicles (such as police, fire, tow, or medical vehicles) from non-emergency vehicles. The video/image processing module may do this by detecting emergency lights on emergency vehicles, for example.

Additionally, in certain situations, an approaching vehicle that is selected to be detected (such as an emergency vehicle or recklessly driven vehicle) may be detectable by the video/image processing module prior to being detectable by the sound processing module, or vice versa. Location of the user using the VSS may be tracked and/or identified by the geographic location processing module, so that the VSS is aware of a situation of the user. With this identification of the user, the VSS can activate (such as power up or on) and/or deactivate (such as power down or off), respectively, the sound processing module and/or the video/image processing module depending on the situation. For example, when surrounding ambient noise conditions are below a predetermined threshold, such as on a local road with lower noise levels, the VSS may power down or off the video/image processing module; whereas, when surrounding ambient noise conditions are above the predetermined threshold, such as on a highway or freeway with higher noise levels, the video/image processing module may be powered up or on. To enhance the determination of a user's location, the geographic location processing module may include or operate with a global positioning system (GPS).

In addition, a control module, such as priority assigner/detect module, may assign a priority value to one or more safety scores or rankings of the sound processing module and/or the video/image processing module. For example, respective priority values ($P_1$ and $P_2$, respectively) may be assigned to safety scores of the sound and video/image processing modules (S(t) and V(t), respectively). Also, these respective priority values may be based on another score, such as a safety score from the geographic location processing module (G(t)). A summation of products of respective scores and priority values can equal an overall safety rating (T). In short, $P_1 S(t) + P_2 V(t) = T$.

Where T is less than a threshold of a minimal master safety score (which may be tuned for road conditions), a safety hazard flag may be triggered by the priority assigner/detect module. This safety hazard flag then may be passed to speakers directly or through a media control unit of the VSS.

The S(t) and the V(t) may be a function of time, and may be real time scores. For example, the scores may be determined relative to high-speed sound recording and video/image recording times. In such an example, the scores may be determined and/or updated within nanoseconds.

In the case of passing a flag to the media control unit, audio media perceived by the user may be muted or faded to mute. In one example, the volume of the audio media may be lowered with respect to a distance between a potential hazardous or emergency vehicle and the user. As the hazardous or emergency vehicle approaches a danger zone (a predetermined dangerous distance to the user) the media may be faded. Once the vehicle is in the danger zone, the media can be muted completely.

Regarding FIG. 1, depicted are example aspects of an example VSS, including a top perspective view of an example motorcycle helmet 100 that includes cameras 104 and 106 of the VSS for recording rear and side views with respect to a user of the VSS. Also depicted are respective centerlines 104a and 106a, respective boundaries 104b, 104c, 106b, and 106c, and respective view angles 104d and 106d of views of the cameras 104 and 106. In FIG. 1, the views overlap 108, so that the VSS can record a continuous rear and side view. Similarly, the microphones may be placed in a similar manner, or in any other configuration that records surround audible sound.

Regarding FIG. 2, depicted are example aspects of an example VSS 200. As depicted the VSS 200 includes a sound processing module and one or more microphones 202, a video/image processing module and one or more cameras 204 (such as the cameras 104 and 106 of FIG. 1), a geographic location processing module and GPS 206, a priority assigner/detect module 208, a media control module 210, a head unit 212 (that may drive transducers such as headphones or one or more loudspeakers), and a control bus 214 that communicably couples the aforementioned depicted aspects of the VSS 200. Also depicted is the geographic location processing module and GPS 206 wirelessly communicably coupled with a network 216. The network 216 may be a GPS satellite network, telecommunications network, and/or the like.

Also shown, the sound processing module and the video/image processing module may communicate S(t) and V(t) respectively with the other elements of the VSS 200 (such as the priority assigner/detect module 208). Furthermore, FIG. 2 depicts other elements of the VSS (200), such as the priority assigner/detect module 208 communicating S'(t) and V'(t) back to the sound processing module and the video/image processing module; where S'(t) and V'(t) represent respective feedback signals of a control loop initiated by S(t) and V(t). Upon receiving the S'(t) and V'(t), the S(t) and V(t) may be adjusted accordingly based at least partially on S'(t) and V'(t). S'(t) may, for example, represent an indication of ambient noise. V'(t) may, for example, provide signals used in auto focus, auto contrast, and the like.

Further, the feedback signals may provide information that can be used to control sensitivity of the microphones or resolution of the cameras. For example, where an alert is continually occurring, the priority assigner may change the resolution to a higher level for verification. In such a case and others, the feedback signals may be a flag for automatic reconfiguration of parameters of the microphones or cameras, such as auto focus, auto contrast, and the like.

Figure 3:
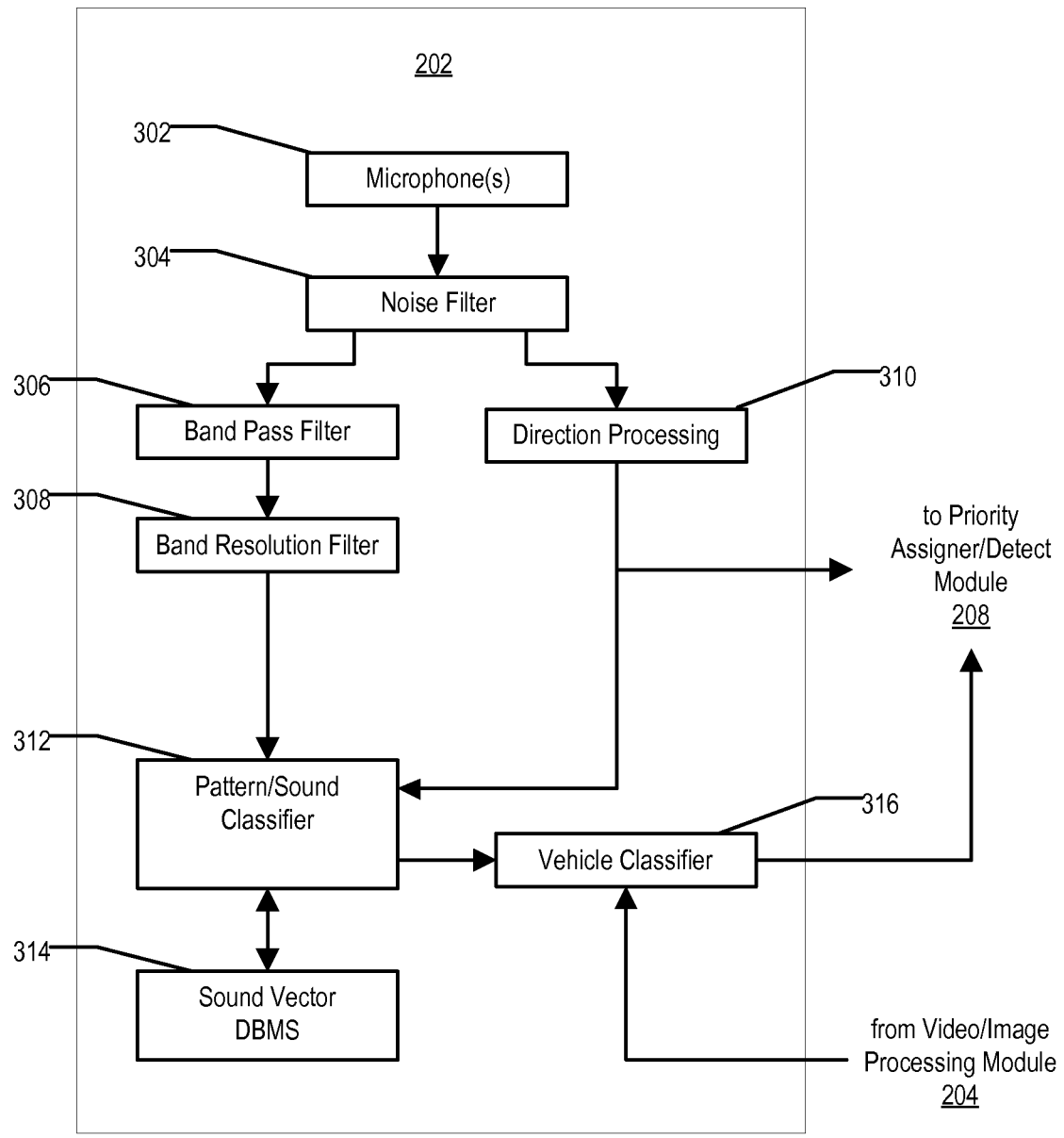
FIG. 3 illustrates a block diagram of an example sound processing module and example microphone(s) of the VSS such as the VSS of FIG. 2.

FIG. 3 illustrates a block diagram of the sound processing module 202 and one or more example microphones 302. Also shown is the flow of one or more related signals internal and external to the sound processing module 202.

As shown, sound signal(s) may be recorded by the microphone(s) 302. Then irrelevant background or environment noise of the sound signal(s) is filtered by noise filter 304. Next, the filtered signal(s) are communicated to a band pass filter 306 and/or direction processing module 310. The direction processing module 310 may determine locations of objects producing elements of the sound signal(s), alternatively, or in addition, directions from which sounds are arriving may be determined. Further, after passing through the band pass filter 306, the filtered sound signal(s) may pass through a band resolution filter 308. In one example, filters 306 and 308 may enhance the definition of and/or amplify desired components of the sound signal(s).

From the band resolution filter 308 and the direction processing module 310, the sound signal(s) and/or components of the sound signal(s) may be identified and classified by a pattern and/or sound classifier 312, which is communicatively coupled to a sound vector database management system 314. Subsequent to this classification process, the components may be further classified by vehicle type at a vehicle classifier 316.

With respect to parts of the VSS external to the sound processing module 202, as depicted, the direction processing module 310 may communicate directional information to the priority assigner/detect module 208. Also, the vehicle classifier 316 and/or the pattern and/or sound classifier 312 may communicate sound signal classification information to the priority assigner/detect module 208. Further, the vehicle classifier 316 may receive vehicle classification information from the video/image processing module 204.

FIG. 4 illustrates a block diagram of the video/image processing module 204 and one or more example cameras 402

(such as the cameras 104 and 106 of FIG. 1). Also shown is the flow of one or more related signals internal and external to the video/image processing module 204.

As depicted, video/image signal(s) may be record by the camera(s) 402. From these video/image signal(s), a track/lane detection and scene detection module 404 may detect data associated with speed and horizontal movement of approaching object(s). Then a computation module 406 may determine the speed and the horizontal movement of the approaching object(s) from data detected at the track/lane detection and scene detection module 404. Next, a correlation module 408 may correlate such information with information associated with corresponding object classifications (such as vehicle classifications) and/or sound signal(s) from the sound processing module 202.

With respect to parts of the VSS external to the video/image processing module, as depicted, the track/lane detection and scene detection module 404 may communicate speed and horizontal movement data to the head unit 212 and/or the media control module 210. Also, the computation module 406 may receive a user's and approaching object's location information from the network 216, the geographic location processing module 206, and/or the GPS 206. Further, the correlation module 408 may communicate correlated data to the priority assigner/detect module 208.

Regarding a priority assigner/detect module (or just a priority assigner), such a module may assign priority to the signals V(t) and S(t) and determine whether output and these signals are valid. For example, where a driver is driving on a highway, V(t) will be given a greater priority, such as 70% priority to S(t)'s 30% priority. On a highway, it may be expected that a driver's own engine noise may interfere with sound signals from other vehicles. While at lower speeds, S(t) may take priority over V(t), for opposite reasons. Also, the assigner/detect module may receive information from other modules, such as the geographic location module, to reinforce its priority determinations.

In general, the VSS, any module, interface, or other aspect of the VSS, or any other device or system operating in conjunction with the VSS may include a part, portion, or all of one or more computing devices of various kinds. A part, portion, or all of a computing device may include a set of instructions that can be executed to cause the part, portion, or all of a computing device to perform any one or more of processes or computer based functions disclosed. A part, portion, or all of a computing device may operate as a standalone device or may be connected, such as, using a network, to other computer systems or peripheral devices. A part, portion, or all of a computing device may be implemented using electronic devices that provide voice, audio, video, or data communication.

A part, portion, or all of a computing device may also include a processor, such as a central processing unit (CPU), one or more digital signal processor, or some combination of different or the same processors. A processor may be a component in a variety of systems. A processor may be one or more general processors, digital signal processors, application specific integrated circuits, field programmable gate arrays, servers, networks, digital circuits, analog circuits, combinations thereof, or other now known or later developed devices for analyzing and processing data. A processor may implement a software program, such as code generated manually or programmed.

The term "module" may be defined to include a plurality of executable modules. The modules may include software, hardware, firmware, or some combination thereof executable by a processor. Software modules may include instructions stored in memory or another memory device that may be executable by a processor. Hardware modules may include various devices, components, circuits, gates, circuit boards, and the like that are executable, directed, or controlled for performance by a processor.

A part, portion, or all of a computing device may also include memory that can communicate via a bus. Memory may be a main memory, a static memory, or a dynamic memory. Memory may include computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. Also, memory may include a cache or random access memory for a processor. Alternatively, memory may be separate from a processor, such as a cache memory of a processor, a system memory, or other memory. Memory may be an external storage device or database for storing data. Examples include a hard drive, compact disc ("CD"), digital video disc ("DVD"), memory card, memory stick, floppy disc, universal serial bus ("USB") memory device, or any other device operative to store data. Memory is operable to store instructions executable by a processor.

The modules, functions, acts, or tasks illustrated in the figures or described may be performed by a programmed processor executing instructions stored in the memory. The modules, functions, acts or tasks may be independent of the particular type of instructions set, storage media, processor or processing strategy and may be performed by software, hardware, integrated circuits, firm-ware, micro-code and the like, operating alone or in combination. Processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

A part, portion, or all of a computing device may also include an input device configured to allow a user to interact with any of the components of the VSS. The input device may include hardware and/or software for receiving voice input or tactile input (such as pressing a key on a keypad).

A part, portion, or all of a computing device may also include a communication interface or port for communicating voice, video, audio, images or any other data over a network. This interface or port may be connected to a bus that may connect any or all parts or portions of a computing device.

The term "computer-readable medium" may include a single storage medium or multiple storage media, such as a centralized or distributed database, or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In alternative examples, dedicated hardware implementations, such as application specific integrated circuits, programmable logic arrays and other hardware devices, may be constructed to implement various aspects of the VSS. One or more examples described may implement functions using two or more specific interconnected hardware modules or devices with related control and data signals that can be communicated between and through modules, or as portions of an application-specific integrated circuit. The VSS may encompass software, firmware, and hardware implementations.

The VSS described may be implemented by software programs executable by a computer system. Implementations can include distributed processing, component/object distributed processing, and parallel processing. Alternatively, virtual computer system processing can be constructed to implement various aspects of the VSS.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the invention have been described, it may be apparent to those of ordinary skill in the art that many more embodiments and implementations are possible within the scope of the invention. For example, much of the above description presents aspects of the invention utilized by vehicle surround view systems; however, other types of surround view systems may utilize these aspects and other aspects of the invention as well. Accordingly, the invention is not to be restricted except in light of the attached claims and their equivalents.

We claim:

1. A system, comprising:
one or more data modules operable to receive, process, and transmit data associated with one or more audio or audio and visual cues from surroundings of a user;
one or more cameras and one or more microphones communicatively coupled to the one or more data modules, where the one or more cameras and the one or more microphones are operable to:
detect, respectively, the one or more audio or audio and visual cues, and
transmit, respectively, the data associated with the one or more audio or audio and visual cues to the one or more data modules; and
one or more speakers operable to output audio media as audible sound and receive, from the one or more data modules, processed data associated with the one or more audio or audio and visual cues, the processed data being based on one or more of a determination and a classification of one or more of the audio cues as a predetermined sound or type of sound, and the one or more speakers being driven to reduce the output audio media based on the received processed data wherein reducing the output audio media based on the received processed data comprises lowering a volume of the output audio media with respect to a distance between a location of the one or more audio or audio and visual cues and the user.

2. The system of claim 1, where the one or more cameras include at least one low resolution video camera.

3. The system of claim 1, where the one or more cameras are operable to detect side and rear views of the user and wherein reducing the output audio media based on the received processed data comprises fading the output audio media as a location of the one or more audio or audio and visual cues nears a danger zone and muting the output audio media once the location of the one or more audio or audio and visual cues enters the danger zone, the danger zone comprising a predetermined dangerous distance to the user.

4. The system of claim 1, where the one or more cameras reside on one or more side or back areas of a vehicle, a helmet, or an other type of gear of the user, and where the one or more cameras face outwards from the vehicle, the helmet, or the other type of gear, respectively.

5. The system of claim 1, where the one or more cameras detect image data from a plurality of views, and where two or more views of the plurality of views of the one or more cameras overlap.

6. The system of claim 1, where the one or more microphones are at least operable to receive sound from the rear and sides of the user.

7. The system of claim 1, where the one or more microphones reside on one or more side or back areas of a vehicle, a helmet, or an other type of gear of the user, and where the one or more microphones are facing outwards from the vehicle, the helmet, or the other type of gear, respectively.

8. The system of claim 1, where one or more fields of sound reception of the one or more microphones overlap and wherein reducing the output audio media comprises muting the output audio media.

9. The system of claim 1, where the one or more speakers are operable to provide audio signals to the user, where the one or more speakers reside on one or more front, side, or back areas of a vehicle, a helmet, or an other type of gear of the user, and where the one or more speakers face towards the user.

10. The system of claim 9, where the one or more speakers attach to, secure to, or embed in the one or more front, side, or back areas of the vehicle, the helmet, or the other type of gear of the user.

11. The system of claim 1, where the one or more data modules include a sound processing module, an image processing module, a geographic location processing module, and one or more control modules.

12. The system of claim 11, where the one or more control modules include a priority assigner module.

13. The system of claim 11, where the one or more control modules include a media control module.

14. The system of claim 11, where the sound processing module includes a sub-module that is operable to selectively filter out noise, including background or environment noise, from the data associated with the one or more audio cues.

15. The system of claim 11, where the sound processing module includes a sub-module that is operable to selectively filter for warning data, including vehicle sirens or horns, from the data associated with the one or more audio cues.

16. The system of claim 11, where the sound and the image processing modules include respective sub-modules operable to determine one or more of a source or a location of the source of the one or more audio or audio and visual cues.

17. A system, comprising:
one or more data modules operable to receive, process, and transmit data associated with one or more audio or visual cues from surroundings of a user, where the one or more data modules include a priority assigner module;
one or more cameras and one or more microphones communicatively coupled to the one or more data modules, where the one or more cameras and the one or more microphones are operable to:
  detect, respectively, the one or more audio or visual cues, and
  transmit, respectively, the data associated with the one or more audio or visual cues to the one or more data modules; and
one or more speakers operable to receive, from the one or more data modules, processed data associated with the one or more audio or visual cues, the processed data being based on one or more of a determination and a classification of one or more of the audio cues as a predetermined sound or type of sound, and the one or more speakers being driven based on the received processed data, where the sound and the image processing modules include respective sub-modules operable to generate safety information, including a safety score, from the data associated with the one or more audio or visual cues, wherein the priority assigner module is operable to assign a priority value to the safety score of each of the sound and the image processing modules and to determine an overall safety score corresponding to a summation of the safety score of each of the sound and the image processing modules as adjusted by the respective priority value, and wherein audio is selectively output from the one or more speakers based on a comparison of the overall safety score to a threshold.

18. Headwear, comprising:
one or more data modules operable to receive, process, and transmit data associated with audio and visual cues from surroundings of the headwear;
one or more cameras and one or more microphones communicatively coupled to the one or more data modules, where the one or more cameras and the one or more microphones are operable to:
  detect, respectively, the audio and visual cues,
  transmit the data associated with the audio and visual cues to the one or more data modules, and
  the one or more microphones providing noise cancellation; and
one or more speakers operable to output audio media from an audio media source, receive, from the one or more data modules, processed data associated with the audio and visual cues as detected by the one or more cameras and the one or more microphones that selectively provide noise cancellation and adjust audio media that is currently output by the speakers based on the processed data associated with the audio and visual cues as detected by the one or more cameras and the one or more microphones that selectively provide noise cancellation and based on a distance between a location of the audio and visual cues and a location of a user.

19. The headwear of claim 18, wherein adjusting the audio media that is currently output by the speakers based on the processed data comprises muting or fading the audio media based on the detection of the one or more visual cues.

20. An apparatus for alerting a user of a motorcycle, comprising:
attachment parts operable to attach the apparatus to the motorcycle or gear of the user;
one or more circuits comprising a processor and a storage device, where the storage device includes processor executable instructions operable to receive, process, and transmit data associated with audio or visual cues of side or rear surroundings of the apparatus;
one or more cameras and one or more microphones communicatively coupled to the one or more circuits, where the one or more cameras and the one or more microphones are operable to:
  detect, respectively, the audio or visual cues, and
  transmit the data associated with the audio or visual cues to the one or more circuits; and
one or more speakers operable to:
  output audio media,
  receive, from the one or more circuits, processed data associated with the audio or visual cues, the processed data being based on one or more of a determination and a classification of one or more of the audio cues as a predetermined sound or type of sound, and
  output the audio media at a reduced volume selected based on the processed data associated with the audio or visual cues, the processed data including a generated safety score or safety rating determined based on one or more of the audio or visual cues.

* * * * *